United States Patent [19]

Grob et al.

[11] Patent Number: 4,899,649
[45] Date of Patent: Feb. 13, 1990

[54] DEEP FAT FRYING APPARATUS HAVING AN IMPROVED COOKING FLUID FILTRATION SYSTEM

[75] Inventors: James T. Grob; John M. Kinch, both of Shreveport, La.

[73] Assignee: The Frymaster Corporation, Shreveport, La.

[21] Appl. No.: 224,797

[22] Filed: Jul. 26, 1988

Related U.S. Application Data

[63] Continuation-in-part of Ser. No. 168,164, Mar. 15, 1988.

[51] Int. Cl.[4] .............................................. A47J 27/12
[52] U.S. Cl. ........................................ 99/408; 99/403
[58] Field of Search .................................. 99/403, 408

[56] References Cited

U.S. PATENT DOCUMENTS

| Re. 26,672 | 9/1969 | Wilson et al. | 99/408 X |
|---|---|---|---|
| 3,107,601 | 10/1963 | Longmire | 99/408 X |
| 3,167,435 | 1/1965 | Hall | 99/408 X |
| 3,787,594 | 1/1974 | Palmason | 99/408 X |
| 4,195,667 | 4/1980 | Moore et al. | 137/637.1 |
| 4,210,123 | 7/1980 | Moore et al. | 126/374 |
| 4,210,177 | 7/1980 | Moore et al. | 137/613 |
| 4,259,567 | 3/1981 | Moore et al. | 219/327 |
| 4,324,173 | 4/1982 | Moore et al. | 99/330 |
| 4,420,006 | 12/1983 | Moore et al. | 134/167 |
| 4,444,095 | 4/1984 | Anetsberger et al. | 99/408 |

*Primary Examiner*—Stephen Marcus
*Assistant Examiner*—Christine A. Peterson
*Attorney, Agent, or Firm*—Hubbard, Thurman, Turner & Tucker

[57] ABSTRACT

A multi-frypot, deep fat frying assembly is formed by operatively interconnecting a filtered, multiple frypot cooking module with one or more nonfiltered, multiple frypot cooking modules, each module having headered cooking fluid supply and drain piping systems disposed within its outer housing. To form the ganged frypot assembly, the module housings, with appropriate side panels removed, are placed in a side-by-side orientation and the adjacent headered piping systems are connected to one another to form in the assembly common supply and drain headers. The filtered module is provided with a roll-out, self-contained filter unit which may be moved into and out of the filtered module housing directly beneath its frypots, the filter unit having a cooking fluid receiving container which carries a filter pump that may be quick-connected to the supply header. The drain header in the filtered module has a pivotally mounted outlet tube which may be pivoted rearwardly to operatively position it over the receiving container, or pivoted forwardly to position its over a suitable disposal container positioned at the front of the filtered module's housing. A spring loaded detent member is used to releasably lock the outlet tube in either its forwardly or rearwardly pivoted position. The outlet side of the filter pump is provided with the diverter valve operative to circulate cooking oil through the pump and filter to provide the assembly with a cooking oil "polishing" cycle.

11 Claims, 5 Drawing Sheets

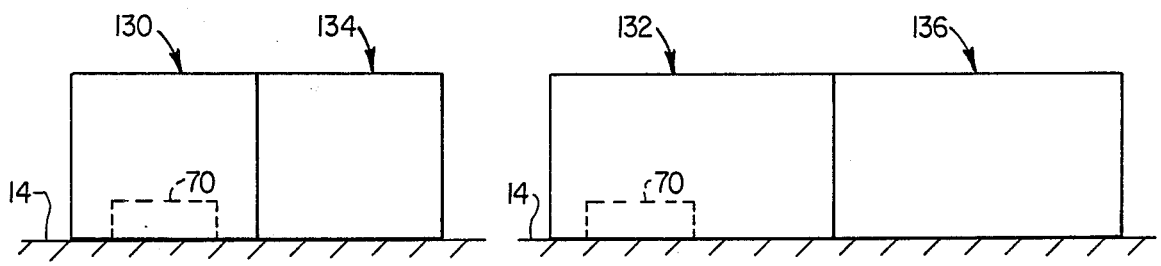
FIG. 8  FIG. 9
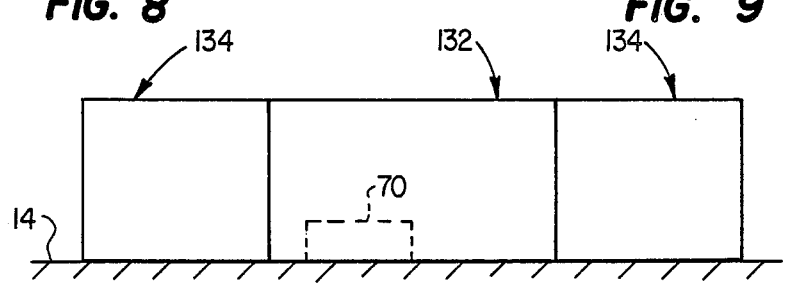
FIG. 10
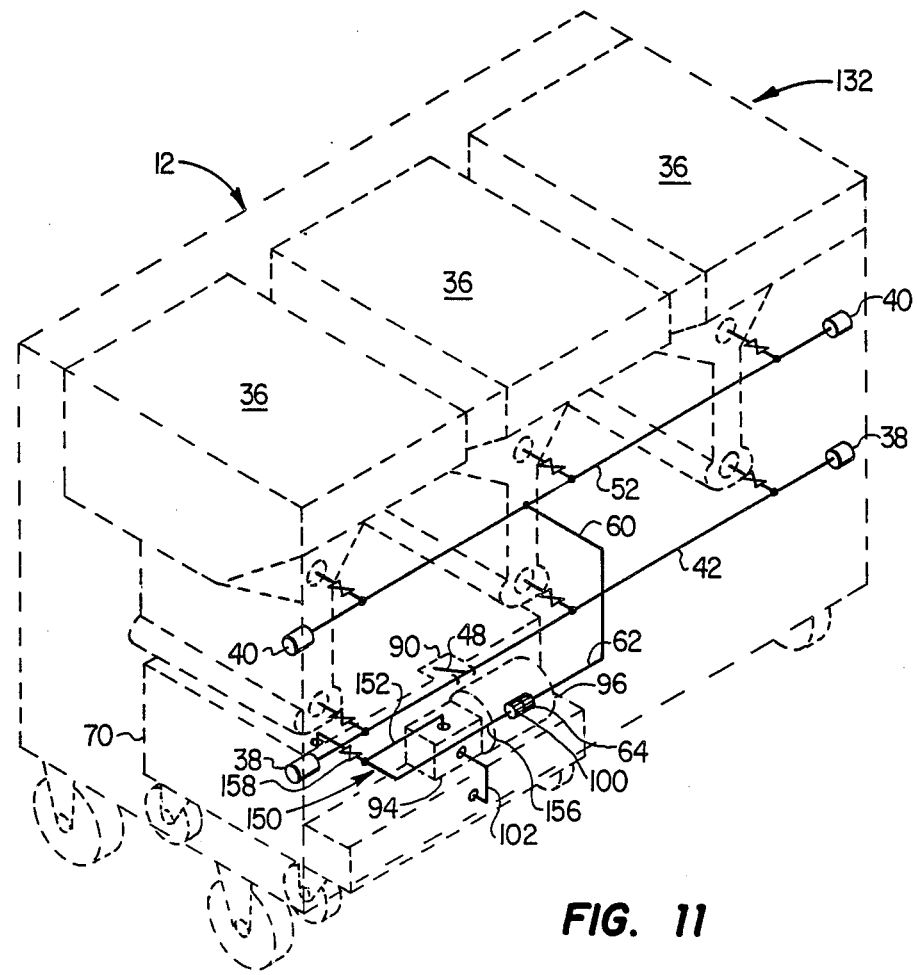
FIG. 11

DEEP FAT FRYING APPARATUS HAVING AN IMPROVED COOKING FLUID FILTRATION SYSTEM

CROSS-REFERENCE TO RELATED APPLICATION

This application is a continuation-in-part of U.S. application Ser. No. 168,164 filed on Mar. 15, 1988.

BACKGROUND OF THE INVENTION

The present invention relates generally to cooking equipment and, in a preferred embodiment thereof, more particularly provides deep fat frying apparatus having an improved cooking fluid filtration system.

The frying in commercial cooking facilities of various food items such as french fries, breaded chicken and fish and the like is conventionally performed using fryer structures that typically comprise at least two large capacity metal frypots operatively supported within an upper portion of a suitable housing. Each of the frypots has a heated upper portion, in which the food is actually fried in a cooking fluid such as oil or melted lard, and an elongated, unheated "cold well" portion which depends from the upper frypot portion and is designed to receive and retain food bits that inevitably fall from the frier racks. The relatively cooler temperature of the cooking fluid in the unheated wells tends to prevent the fallen food particles from burning and thereby unduly hastening the need to replace the cooking fluid in the frypots with a fresh supply.

It is well known that the useful life of a given batch of cooking fluid may be further extended by periodically draining the oil, filtering the particulate food matter from the drained fluid, and then returning the cleansed fluid to its frypot for further food frying use. Heretofore, the equipment needed to effect this very advantageous filtration process has required a considerable amount of additional operation and/or storage floor space beyond that occupied by the fryer housing, the housing floor space normally being only somewhat greater than the vertically projected floor area of the large capacity frypots.

As an example, it has been conventional practice to position the filtration and associated pumping equipment in a separate floor mounted filtration housing built onto one side of the frypot housing. Not only does this require a significant amount of additional floor space, which is usually at a high premium in most commercial cooking facilities such as fast food restaurants, but also inhibits the ability to add additional frypot sections to the existing frypot housing should business expand or frying needs otherwise increase.

It is accordingly an object of the present invention to provide deep fat frying apparatus, having an improved cooking fluid filtration system, which eliminates or minimizes the above-mentioned and other problems, limitations and disadvantages typically associated with conventional deep fat frying structures and their floor space-consuming fluid filtration systems.

SUMMARY OF THE INVENTION

In carrying out principles of the present invention, in accordance with a preferred embodiment thereof, deep fat fryer apparatus is provided which has an improved cooking fluid filtration system that requires no additional floor space, is of an economical and quite simple construction, provides improved operational safety, and further provides ready access to its filtering and pumping components for maintenance and cleaning purposes.

The apparatus includes a floor mounted housing having an open lower end, a lower internal portion, an upper internal portion directly above and in communication with the lower internal portion, and means for defining a horizontally facing access opening to the lower internal housing portion, the access opening extending from the floor to the upper end of the lower internal housing portion.

A pair of large capacity metal frypots are operatively supported side-by-side within the upper internal housing portion, each of the frypots having a heated upper portion, in which food is supported on a rack or the like and fried in a cooking fluid such as oil or melted lard, and an elongated, unheated "cold well" portion depending therefrom. As used herein with reference to each frypot, the term "large capacity" means that the frypot is capable of holding the melted product of a fifty pound block of cooking lard (the standard size commercially available) or an equivalent volume of cooking oil.

To periodically drain the cooking fluid from a selected one of the frypots for filtration purposes, a suitably valved drainage conduit system is disposed within the upper internal housing portion and has an inlet portion operatively connected to each of the frypot wells, and a discharge opening positioned between and slightly below the wells. Return of filtered cooking fluid to the drained frypot is effected through a suitably valved supply conduit system disposed in the upper internal housing portion and having an outlet portion connected to the upper frypot portions, and a flexible inlet end portion extendable into the lower internal housing portion adjacent the aforementioned access opening.

The improved cooking fluid filtration system of the present invention includes a wheel-supported cooking fluid receiving container having a holding capacity at least large enough to receive the entire cooking fluid contents of one of the frypots. The fluid receiving container has a top opening, a bottom wall from which a drain sump depends, a front side portion, and a rear side portion. A cooking fluid filter element is operatively positioned on the bottom wall of the container and extends over the open upper end of the drain sump. A filtration pump and its associated electric drive motor are externally mounted on a front side portion of the container for movement with the container, the pump having an inlet communicating with the interior of the drain sump, and an outlet having a quick disconnect fitting operatively secured thereto.

To ready the fryer apparatus for the draining and filtration of its frypot cooking fluid, the fluid receiving container is simply rearwardly rolled through the access opening into the lower internal housing portion to position the container directly beneath the frypots, position the top opening of the container beneath the outlet of the drainage conduit system, and position the pump outlet adjacent the inlet end portion of the supply conduit system. The flexible inlet end portion of the supply conduit system is conveniently bendable to one side or otherwise to permit unimpeded entry of the container into the lower internal housing portion. With the fluid receiving container conveniently tucked away within the housing beneath the frypot wells, a suitable electrical connection is made to the filtration pump supported on the container, and the inlet end of the supply conduit system is rapidly connected to the pump outlet using its quick-disconnect fitting.

Cooking fluid from within a selected one of the frypots is then drained into the receiving container through the valved drainage conduit system, the received fluid flowing downwardly through the filter member into the drain sump on the lower wall of the container, the filter element removing from the received fluid the particulate food matter suspended therein. Filtered cooking fluid entering the drain sump is pumped upwardly into the drained frypot through the valved supply conduit system, thereby readying the refilled frypot for a subsequent cooking cycle with its now essentially food particulate-free batch of cooking fluid. The cooking fluid in the other frypot may then be drained, filtered and returned in a similar fashion.

To further enhance the overall filtering process, a conventional drop-in food dislodgement shower device is provided that is adapted to be removably secured within the open upper end of the frypot to which cooking fluid is being returned by the receiving container pump. The shower device has an inlet portion which may be quick-connected to an outlet of the supply conduit system at its entry to the frypot, and a discharge header portion configured to extend around the inner periphery of the frypot adjacent its open upper end. Cooking fluid returned to the frypot through the supply conduit is forced downwardly through small, spaced discharge openings formed around the undersurface periphery of the header, thereby forming a series of downwardly directed cooking fluid jets. These jets sweep along the vertical interior side surfaces of the frypot's cooking portion and dislodge adhered food particles therefrom so that they can be flowed to the filter element in the receiving container.

When the cooking fluid in either of the frypots has reached the end of its useful cooking life, it may simply be drained into the fluid receiving container without being returned to the frypot. The filtration pump may then be rapidly disconnected from the inlet end of the supply conduit system, and from its electrical supply, and then rearwardly rolled outwardly through the housing access opening and away from the housing so that the used cooking fluid can be dumped, the container cleaned, and the filter element replaced. After this task is completed, the container is simply rolled back into the frypot housing and the pump rapidly reconnected to its electrical supply and to the internal supply conduit system as previously described.

It can readily be seen that, due to the wheel-mounted fluid receiving container and associated fluid pump apparatus which are uniquely positionable directly beneath the frypots wholly within their supporting housing, the entire cooking fluid pumping and filtration system requires no additional floor space beyond that occupied by the frypot housing. This filtration system positioning frees the previously required additional floor space for additional cooking apparatus. It also permits greater flexibility in adding additional frypot sections to the frypot housing since such additional section or sections may now be built onto either side of such housing. In the event that this is done, it is a simple matter to internally extend the drainage and supply conduit systems to the new frypot section or sections.

Moreover, it can also be seen that the mounting of the filtration pump on the movable fluid receiving container, together with the quick disconnect fitting carried by the pump outlet, permits the critical pumping apparatus to be rapidly moved outwardly from the frypot housing to provide very easy access to the pump and its associated drive motor for maintenance, repair and replacement purposes. The wheel-supported fluid receiving container, and its associated filtration and pumping apparatus, can be easily and relatively economically constructed from readily available standard components, and provides for simple yet quite effective filtration of the recycled cooking fluid.

According to another aspect of the present invention, a multi-frypot, deep fat frying station may be formed by operatively interconnecting a filtered, multiple frypot cooking module similar to the fryer apparatus described above with one or more nonfiltered, multiple frypot cooking modules having headered cooking fluid supply and drain piping systems disposed within their housings. To form the ganged frypot assembly, the filtered and nonfiltered module housings, with appropriate side panels removed therefrom, are placed in a side-by-side orientation and the adjacent headered piping systems are connected to one another to form common frypot supply and drain headers in the assembly.

The filtered and nonfiltered modules are preferably formed in two frypot and three frypot versions which may be utilized to form fryer stations having from two to seven ganged frypots with a single roll-in filter/pump unit. The two and three frypot versions, of course, are automatically formed by the two and three frypot modules without utilizing a nonfiltered module. Alternatively, of course, a single nonfiltered frypot module could be operatively connected to either of the filtered modules.

The drain header in each of the filtered modules has a pivotally mounted outlet tube which may be pivoted rearwardly into the module housing to operatively place the discharge end of the tube over the filter unit receiving container, or pivoted forwardly to position the tube over a suitable cooking fluid disposal container brought to the front of the filtered module. Spring loaded detent means are provided for releasably locking the outlet tube in a selected one of its forwardly and rearwardly pivoted positions relative to the filtered module drain header.

According to another feature of the present invention, the filter pump has a diverting valve connected in its discharge piping and operative to cause cooking fluid discharged from the pump to be returned directly to the filter unit receiving container instead of being flowed into one of the frypots. With the valve in its diverting position, cooking fluid is continuously flowed sequentially through the pump and across the filter to thereby provide the assembly with a cooking fluid "polishing" cycle when desired.

BRIEF DESCRIPTION OF THE DRAWINGS

FIG. 8 is a schematic block diagram illustrating a four frypot, filtered cooking assembly formed by operatively interconnecting the modules of FIG. 3 and 5;

FIG. 9 is a schematic block diagram illustrating a six frypot, filtered cooking assembly formed by operatively interconnecting the modules of FIG. 4 and 6;

FIG. 10 is a schematic block diagram illustrating a seven frypot, filtered cooking assembly formed by operatively two of the FIG. 5 modules to the opposite ends of a FIG. 4 module;

FIG. 11 is a simplified schematic perspective view of the FIG. 4 module, shown partially in phantom, illustrating its headered supply and drainage piping system;

DETAILED DESCRIPTION

Figure 1:
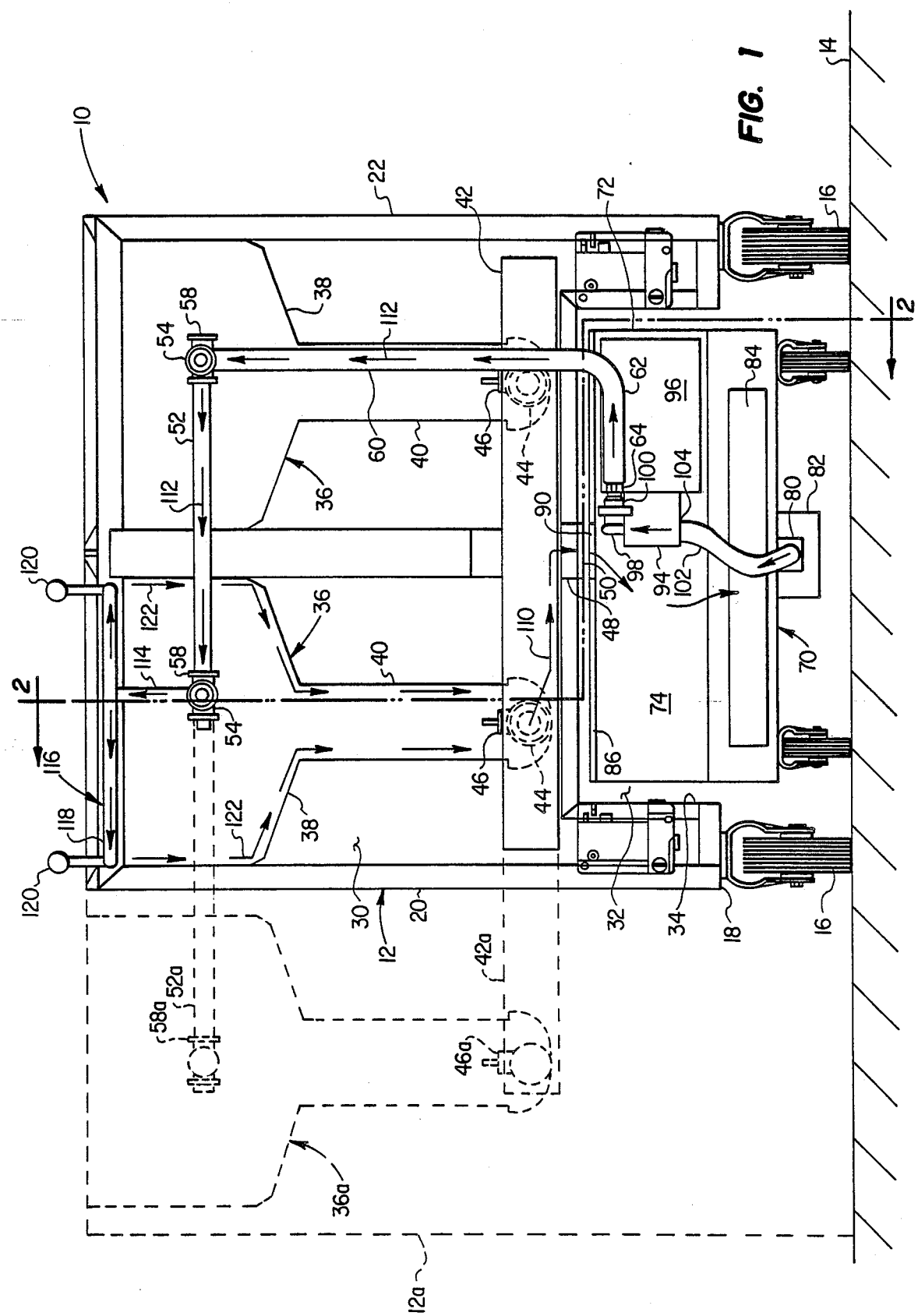
FIG. 1 is a simplified, somewhat schematic front cross-sectional view through a deep fat fryer apparatus which embodies principles of the present invention and is provided with an improved cooking fluid filtration and pumping system.
Figure 2:
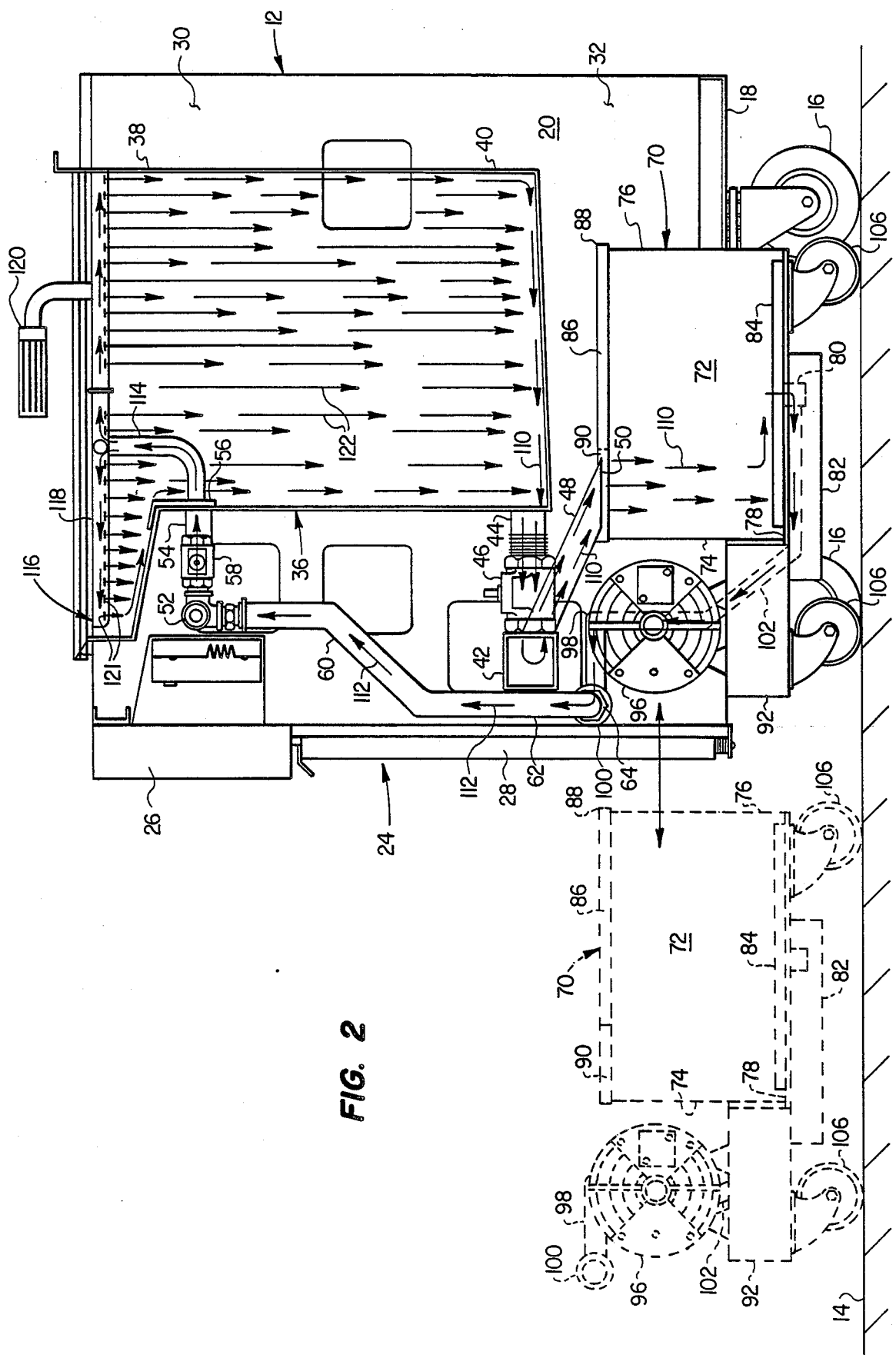
FIG. 2 is a simplified cross-sectional view through the apparatus, partially in elevation, taken generally along line 2—2 of FIG. 1.
Figure 3:
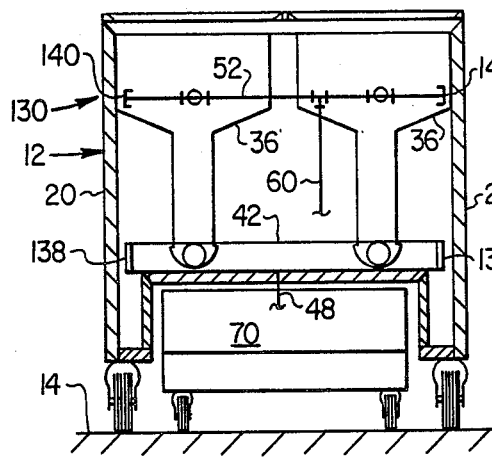
FIG. 3 is a simplified schematic front cross-sectional view through a modular, dual frypot deep fat fryer unit with an under-fryer portable filtration system similar to that shown in FIGS. 1 and 2.
Figure 4:
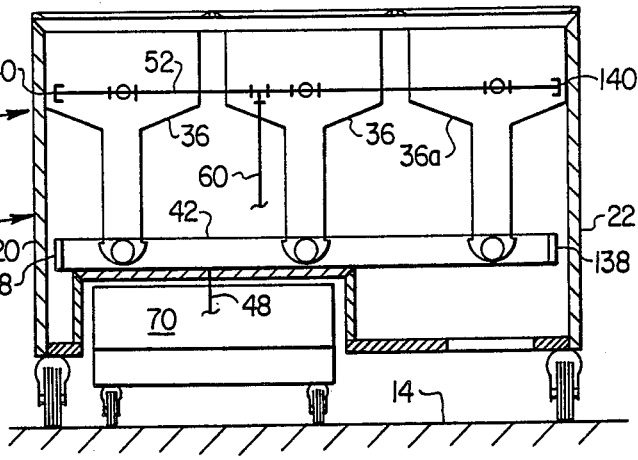
FIG. 4 is a simplified schematic front cross-sectional view through a modular, triple frypot unit similar to construction to that of FIG. 3.
Figure 5:
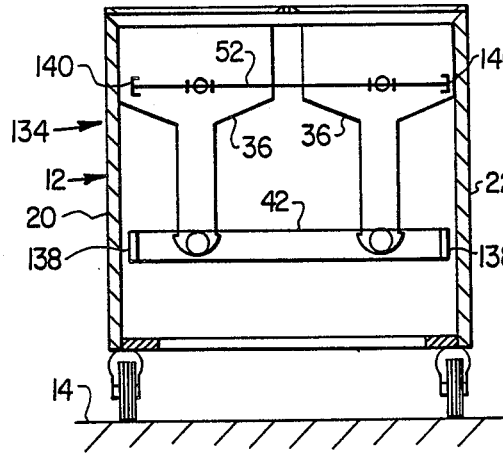
FIG. 5 is a simplified schematic front cross-sectional view through a filterless, dual frypot modular add-on cooking unit which may be operatively connected to either of the modular filtered units shown in FIGS. 3 and 4.
Figure 6:
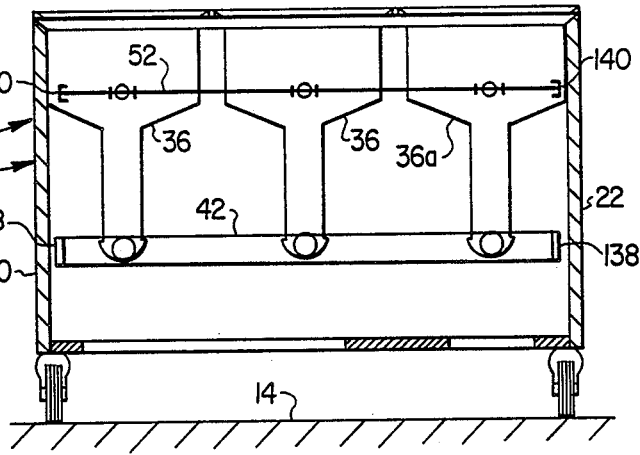
FIG. 6 is a simplified schematic front cross-sectional view through a filterless, triple frypot modular add-on cooking unit which may be operatively connected to either of the modular, filtered units shown in FIGS. 3 and 4.

As illustrated in FIGS. 1 and 2, the present invention provides a deep fat frying apparatus 10 having incorporated therein a unique cooking fluid filtration system to be subsequently described. Apparatus 10 includes a metal housing 12 which is supportable on a floor 14 by wheels 16 so that the housing can be conveniently rolled from one operating location to another. Housing 12 has an elevated, open lower end 18, left and right side walls 20, 22 (as viewed from the front), and a front side wall portion 24 defined by a side-by-side pair of top mounted control panels 26, and a pair of front access doors 28 disposed beneath the control panels. The housing 12 has an upper internal portion 30 and a lower internal portion 32. With the housing doors 28 in their open position, an access opening 34 is defined, such access opening extending vertically from the floor 14 to the upper end of the lower internal housing portion, rearwardly through the housing 12, and horizontally across most of the interior width of the housing.

Operatively supported in the upper internal housing portion 30 are a side-by-side pair of open-topped, large capacity metal frypots 36 which are adapted to receive a quantity of cooking fluid such as cooking oil or melted lard. Each of the frypots 36 has a heated, upper cooking portion 38 from which a vertically elongated, laterally narrower cold well portion 40 depends. For purposes of illustrative clarity, the frypot heating system, which is of a conventional construction, has not been shown in the drawings, but it will be appreciated that such heating system could be of either a gas heating or electric heating type.

The improved apparatus 10 is also provided with a drainage conduit system for draining cooking fluid from a selected one of the frypots 36 for a cooking fluid filtration process subsequently described herein. The drainage conduit system includes an elongated, generally horizontally disposed hollow drain header member 42 which is positioned in the upper internal housing portion 30 forwardly of the lower ends of the cold wells 40. Drain header 42 has a rectangular cross-section and is operatively connected to the cold wells 40 by drain pipe sections 44 which are connected to the lower ends of the cold wells and are provided with suitable drain valves 46 that may be conventionally operated to drain the cooking fluid in either of the frypots 36 into the drain header 42. An outlet conduit 48 is connected to a longitudinally central portion of the drain header 42, slopes rearwardly and downwardly therefrom, and has an open discharge end 50.

Also positioned within the upper internal housing portion 30, forwardly of the frypots 36, is a supply conduit system which, in a manner subsequently described, is used to return filtered cooking fluid to the frypots. The supply conduit system includes a horizontal supply conduit section 52 which is communicated with the interiors of the upper frypot cooking portions 38 by means of a pair of supply conduit branch lines 54 which are connected to the upper frypot portions 38 at quick-disconnect fittings 56. A pair of return valves 58 are interposed in the branch lines 54 and are operable in a conventional fashion to route filtered cooking fluid into a selected one of the frypots 36. Connected to a right end portion of the horizontal supply conduit 52 as viewed in FIG. 1 is a vertically extending flexible inlet conduit 60 which has a lower end portion 62 that may be selectively moved into and out of the lower internal housing portion 32. The inlet end of the conduit portion 62 is provided with a quick disconnect fitting 64.

The apparatus 10 of the present invention is also provided with a substantially improved cooking fluid filtration and pumping system which is rapidly connectable to the previously described drainage and supply conduit systems, and requires no additional floor space beyond that occupied by the housing 12. The filtration and pumping system includes a cooking fluid receiving container structure 70 having a hollow rectangular container body portion 72 which is laterally elongated (i.e., in a left-to-right direction as viewed in FIG. 1).

Hollow body portion 72 has a front side wall 74, a rear side wall 76, a bottom wall 78, and a drain sump 80 depending from the bottom wall 78 and positioned within a protective shroud structure 82. A cooking fluid filter element 84 is releasably clamped (by a conventional mechanism not illustrated) around its periphery to and extends along the upper surface of the bottom wall 78 across the open upper end of the sump 80. The container body portion 72 has a holding capacity at least equal to, but preferably somewhat larger than, the cooking fluid capacity of one of the frypots 36. A lid 86 is hinged along its rear side edge 88 to the open upper end of the container body 72 and is provided with a laterally centrally positioned inlet opening 90 along its front side edge.

Projecting forwardly from a bottom section of the container body front side wall 74 is a ledge portion 92 which supports a cooking fluid filtration pump 94 and an electric drive motor 96 operatively connected thereto. Pump 94 has an outlet 98 provided with a quick-disconnect fitting 100 thereon. A flexible inlet conduit 102 is extended through the ledge portion 92 and the shroud structure 82, and is connected at its opposite ends to the pump inlet 104 and the drain sump 80.

The fluid receiving container structure 70 is movably supported in an elevated position by small wheels 106 and is configured to be rolled rearwardly from its dotted line position in FIG. 2 into the lower internal housing portion 32 through the access opening 34 to the solid line position of the container structure 70 shown in FIG. 2. With the container structure 70 in this solid line position, it is disposed generally within the vertically projected floor area of the frypots 36, with the container body 72 disposed generally beneath the cold wells 40, and the lid inlet opening 90 disposed directly beneath the drainage conduit system outlet opening 50 to thereby form an operative connection between the container body 72 and the drainage conduit system.

With the container structure 70 rolled inwardly to this position, the filtration and pumping system may be rapidly connected to the supply conduit system simply by securing the quick disconnect fitting 64 on the flexible conduit end portion 62 into the disconnect fitting 100 on the pump outlet. During insertion of the container structure 70 into the lower internal portion of the housing, the flexible conduit end portion 62 may simply be bent out of the way so as not to impede the entry of the container structure. The pump motor 96 may then be simply plugged into a suitable electrical outlet (not shown) disposed within the housing 12 at a convenient location. The cooking fluid filtration and pumping system is then ready for operation in a manner which will now be described.

For purposes of illustration, it will be assumed that the cooking fluid in the left frypot 36 in FIG. 1 is to be drained, filtered and returned to such frypot. To initiate the filtering operation, the left drain valve 46 is opened, thereby permitting a gravity drainage flow 110 of cooking fluid sequentially from the left cold well 40 into the drain header 42, downwardly through the outlet conduit 48, and into the container body 72 through its lid inlet opening 90. After the cooking fluid in the left frypot 36 is drained into the container body 72 in this manner, the left return valve 58 is opened and the pump motor 96 is energized to draw cooking fluid within the container body 74 downwardly into the sump 80 across the filter element 84 to remove particulate food matter from the cooking fluid. The purified cooking fluid entering the sump 82 is drawn upwardly into the pump inlet 104 via the inlet conduit 102. The filtered cooking fluid is then pumped upwardly through the supply conduit system as indicated by the arrows 112.

The filtered returning cooking fluid passing inwardly through the left return valve 58 (FIG. 1) is flowed into the inlet portion 114 of a drop-in cooking fluid shower structure 116 removably positioned within the upper end of the left frypot 36. Shower structure 116 is of the type illustrated and described in U.S. Pat. No. 4,259,567 to Moore et al. to which reference may be made for further detail relating thereto. However, for sake of completeness, the shower structure 114 will be briefly described herein.

The inlet portion 114 is removably connected to the frypot quick disconnect fitting 56 (FIG. 2) and communicates at its upper end with a rectangular header section 118 that extends around the interior sidewall surface of the left frypot 36 at its upper end. Header 118 has a pair of upwardly projecting handles 120 secured thereto and is provided around its lower side surface with a spaced series of small discharge openings 121 (FIG. 2).

Accordingly, when cooking fluid is forced upwardly into the header 118, it is discharged downwardly through the openings 120 in the form of small diameter cooking fluid jets 122 which flow along the interior sidewall surfaces of the upper frypot section 38 and dislodge food particles adhering thereto so that they may be flowed downwardly into the well 40 and then transferred into the container body 74 to be trapped by the filter element 84. Thus, with the left drain and return valves 46, 48 in their open position, a continuous cleansing flow of cooking fluid through the left frypot 36 and the filtering and pumping apparatus may be maintained until the circulating cooking fluid is sufficiently free of particulate food matter. At this point, the left drain valve 46 may be closed to permit the pump 94 to completely refill the frypot. The left return valve 58 may then be closed and the left frypot returned to its cooking duties. This same continuous filtration process may then be repeated for the cooking fluid disposed in the right frypot 36.

When a particular batch of cooking fluid in either of the illustrated frypots 36 has reached the end of its useful life, it can simply be drained into the container body 74 by opening the appropriate drain valve 46, and the container structure 70 can be disconnected from its power source, and from the supply conduit system, and rolled outwardly from beneath the frypots so that the used cooking fluid can be dumped and the container structure 70 be cleaned.

It can be seen that since the container structure 70 fits beneath the frypots 36 within the housing 12, it requires no more floor space than that occupied by the frypot housing. This leaves both the left and right sides of the housing 12 (as viewed in FIG. 1) free for connection to another frypot housing structure to form an enlarged, "ganged" frypot housing structure with, for example, six frypots—two additional frypots on each side of the illustrated pair. All that is required to effect this frying capacity enlargement is to extend the drain header 42 and the supply conduit outwardly through the opposite sidewalls 20, 22 of housing 12 and suitably connect them to the added frypot sections.

An example of this expansion is schematically illustrated in phantom in FIG. 1, in which an additional floor mounted frypot housing 12$_a$, having a representative single frypot 36$_a$ therein, is positioned against the left side wall 20 of housing 12. Extensions 42$_a$ and 52$_a$ of the drain header 42 and the supply conduit 52 are carried outwardly through the housing side wall 20 and operatively connected to the drain valve 46$_a$ and return valve 58$_a$, respectively, of the additional frypot 36$_a$, thereby permitting the container structure 70 to serve all of the three illustrated frypots.

In addition to this expansion flexibility permitted by the movable container and pump structure 70, it will also be appreciated that a single structure 70 can be used to provide filtration service to additional sets of frypots positioned at various locations in the cooking facility simply by rolling it across the floor, positioning it below the frypots to be drained and filtered, and making the quick connections previously described.

Finally, the movable structure 70 offers increased operational safety compared to "wand" type drainage containers in which a flexible tube must be inserted into the open upper end of a frypot to effect drainage of its hot cooking oil.

Referring now to FIGS. 3–6, the expansion capability of the frying apparatus 10 previously described in conjunction with FIG. 1 is further enhanced under the present invention by the construction of four multiple frypot cooking modules 130, 132, 134 and 136 which, as will be subsequently described, may be utilized to provide "ganged" frypot cooking stations having from two to seven side-by-side interconnected frypots with associated under-fryer filtration equipment.

Module 130 (FIG. 3) is essentially identical to the previously described frying apparatus 10 (FIGS. 1 and 2), having a floor supportable housing 12 with left and right removable side wall panels 20 and 22, a side-by-side pair of frypots 36, a drain header 42 having an outlet conduit 48, a supply header 52 having an inlet conduit 60, and a roll-in cooking fluid receiving container 70 with the previously described pumping and filtration equipment thereon.

Module 132 is identical to module 130 except that its housing 12 is elongated in a rightward direction and receives an additional frypot $36_a$ which is operatively connected to both the drain header 42 and the supply header 52.

Module 134 is identical to module 130 except that the module 134 is not provided with a cooking fluid receiving container 70, and the drain and supply header conduits 48 and 60 are deleted.

Module 136 is identical to module 132 except that the cooking fluid receiving container 70 is deleted, and the drain and supply header conduits 48 and 60 are also omitted. For purposes later described, the opposite ends of the drain and supply headers 42 and 52 in each of the modules 130, 132, 134 and 136 are provided with removable end caps 138 and 140.

It can be seen that the modules 130 and 132, by themselves, respectively define two and three frypot cooking stations with integral roll-in filtration equipment 70. These filtered frypot modules 130 and 132 may be quickly joined with one or more of the non-filtered modules 134 and 136 to additionally provide multiple frypot cooking stations having from four to seven total frypots and integral roll-in filter apparatus.

Figure 7:
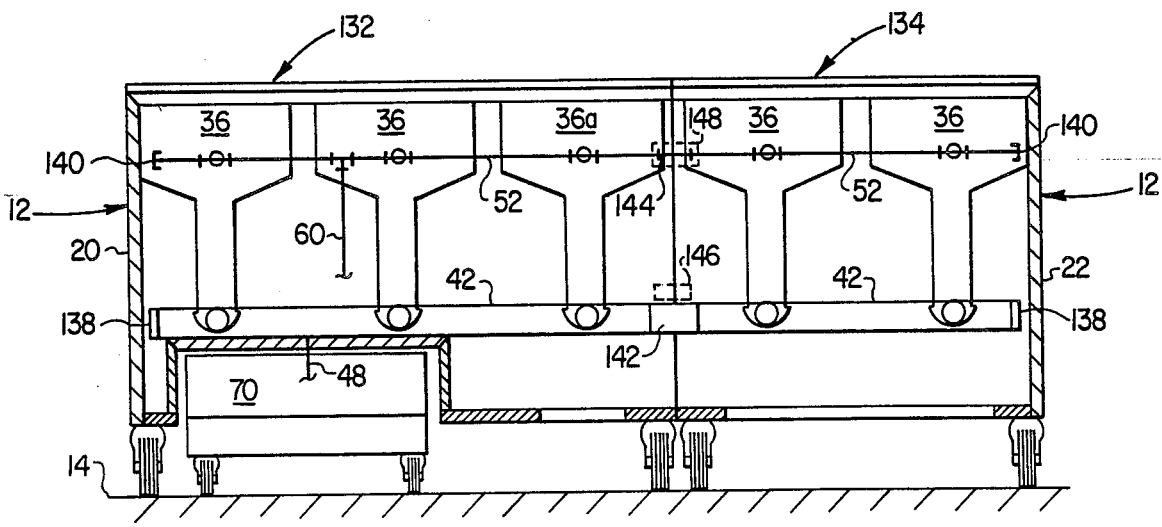
FIG. 7 is a simplified schematic front cross-sectional view through a five frypot, filtered cooking assembly formed by operatively interconnecting the modules of FIGS. 4 and 5.

For example, to form the five frypot filtered cooking assembly depicted in FIG. 7, the filtered three frypot module 132 is simply connected to the two frypot non-filtered module 134 by removing the right sidewall panel 22 of the module 132 and the left sidewall panel 20 of the module 134 and placing the housings 12 of the two modules 132 and 134 in the side-by-side relationship shown in FIG. 7. The facing return and supply header end caps 38 and 40 are then removed and the return and supply headers of the two modules 132 and 134 are operatively interconnected using suitable joining fittings 142 and 144. The housings 12 of the interconnected modules 132 and 134 may be intersecured using suitable interconnecting brackets 146 and 148. By this simple joining expedient, the illustrated five frypot cooking station of FIG. 7 may be quickly formed, each of the five ganged frypots being served by the filtration equipment 70 of the module 132 via the interconnected drain and supply headers 52 of the modules 132 and 134.

In a similar fashion, a four frypot cooking station may be rapidly and easily formed by interconnecting a module 130 with a module 134 (FIG. 8), a six frypot cooking station may be formed by operatively interconnecting a module 132 with a module 136 (FIG. 9), and a seven frypot cooking station may be formed by operatively connecting a pair of nonfiltered, two frypot modules 134 to the opposite sides of a three frypot filtered module 132 as schematically depicted in FIG. 10. It can be seen that the modular construction aspect of the present invention provides a great deal of flexibility and convenience in constructing cooking stations have a predetermined number of ganged frypots, while permitting the station constructed in this manner to be easily expanded as the need arises.

Figure 12:
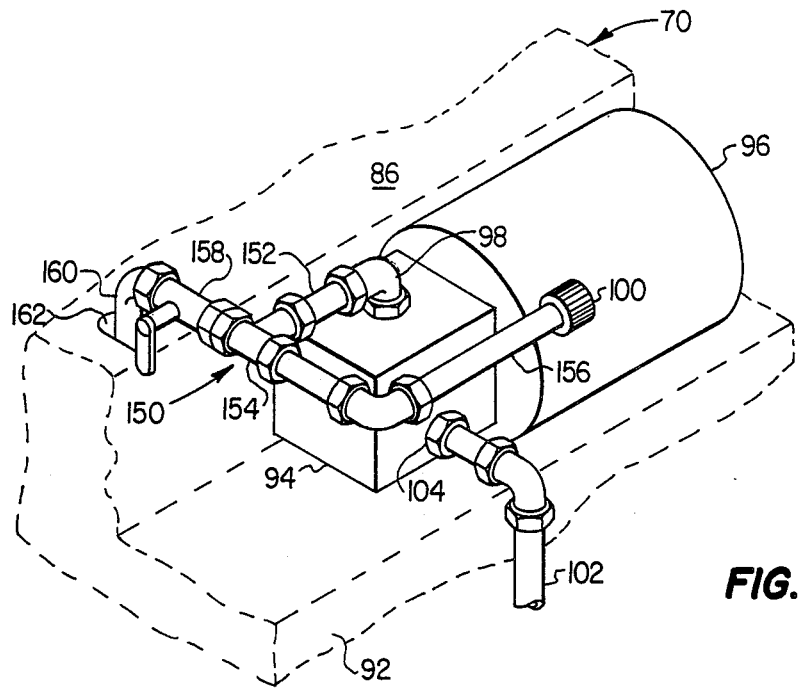
FIG. 12 is an enlarged scale fragmentary perspective view, partially in phantom, of a front portion of the portable filtration unit of the FIG. 11 module illustrating a specially designed cooking oil diverting system associated with the discharge side of the filter pump.

Referring now to FIGS. 11 and 12, each of the roll-in filter and pumping structures of the filtered modules 130 and 132 has a specially designed pump outlet piping circuit 150 which permits cooking fluid discharged from the pump 94 to be selectively routed to the frypots, via the supply header 52 as previously described, or directly back into the cooking fluid receiver 70, across its filter, and back through the pump via the return line 102, to provide the filtration structure with a cooking fluid "polishing" cycle when desired.

Piping circuit 150 includes a discharge pipe 152 interconnected between the pump outlet 98 and the inlet of a tee fitting 154. Connected to one of the outlet sides of the tee fitting 154 is an outlet pipe 156 having the quick disconnect fitting 100 secured to its outer end. A manually operable two-position diverting valve 158 is connected to the opposite outlet side of tee 154 and has a downturned discharge pipe 160 connected to its outlet end and extending downwardly through an opening 162 in the lid 86 of container 70.

With the diverting valve 158 in its closed position, cooking fluid returned to the pump 94 from the container 70 via the pipe 102 is flowed outwardly through the pipe 156 and into the various frypots through the header 52 as previously described. However, with the valve 158 moved to its open position, cooking fluid discharged from the pump 94 is flowed directly into the container 70 via the outlet pipe 160 and is continuously cycled across the filter, through the pump and back into the container 70 to "polish" the cooking fluid.

Figure 13:
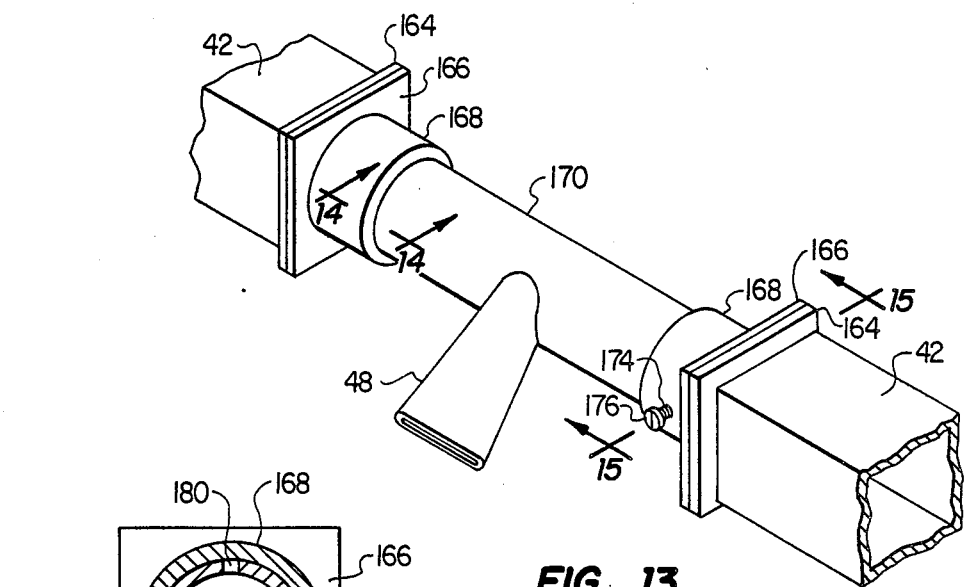
FIG. 13 is an enlarged scale fragmentary perspective view of a pivotally mounted outlet structure interposed in the drain header of the FIG. 11 module.
Figure 15:
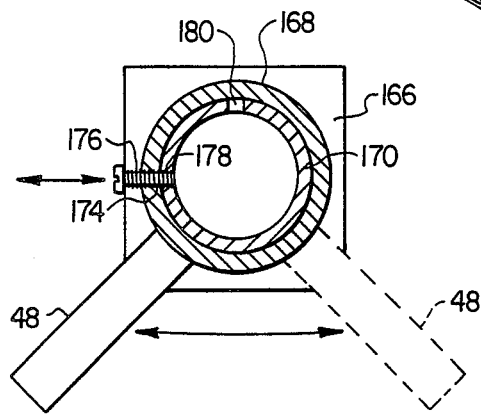
FIG. 15 is an enlarged scale, somewhat simplified cross-sectional view through the outlet structure taken along line 15—15 of FIG. 13.
Figure 14:
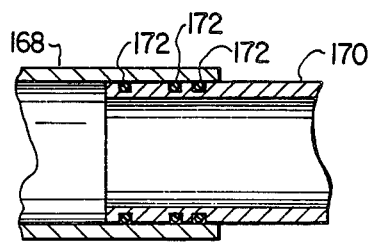
FIG. 14 is an enlarged scale cross-sectional view through the outlet structure taken along line 14—14 of FIG. 13.

According to another feature of the present invention, the cooking fluid drain outlet conduit 48 in each of the filtered modules 130 and 132 is pivotally mounted in the drain header 42, as best illustrated in FIGS. 13–15, for pivotal movement between a forwardly projecting, solid line position (FIG. 15) which permits cooking fluid to be drained into a disposal container (not shown) disposed at the front of the housing 12, and a rearwardly pivoted, dotted line position in which the outlet conduit 48 is positioned over the lid opening 90 (FIG. 11) as previously described.

To effect this pivotal mounting of the outlet conduit 48, an intermediate section of the rectangular drain header 42 is removed and a pair of laterally enlarged rectangular flanges 164, with central openings formed therethrough, are secured to the facing ends of the remaining drain header sections. A pair of similarly dimensioned rectangular flanges 166, having hollow cylindrical collars 168 affixed thereto, are secured to the facing surfaces of the flanges 164. The opposite ends of a hollow cylindrical drain pipe section 170 to a central portion of which the outlet conduit 48 is secured, are rotatably received in the facing collars 168. As best illustrated in FIG. 14, the rotatably received opposite ends of the pipe 170 are externally grooved and receive three 0-ring seal elements 172 which bear against the interior surfaces of the collars 168 to prevent cooking fluid leakage at the junctures between the pipe 170 and the collars 168. As best illustrated in FIG. 15, the right collar 168 (as viewed in FIG. 13) is provided with a circular side wall opening 174 into which a spring-loaded detent pin 176 extends. The inner end of the pin 176 may be received in either of two circular side wall openings 178 and 180 formed in the right end of the drain pipe 170 and circumferentially spaced apart from one another by an angle of approximately 90°. With the detent pin 176 positioned in pipe opening 178, the pipe 170 is locked against rotation relative to the collars 168, and the drain conduit 48 is forwardly and downwardly sloped at an angle of approximately 45° (FIG. 15). In this forwardly pivoted position of the drain conduit 48, it is conveniently positioned to drain cooking fluid into a disposal container (not shown) disposed at the front of the housing 12.

By pulling the detent pin 176 outwardly (i.e., to the left in FIG. 15) the drain conduit 48 may be pivoted through an arc of approximately 90° to its dotted line position in which the drain pipe opening 180 is brought into alignment with the collar opening 174. By allowing the spring-loaded detent pin 176 to snap back into the now repositioned pipe opening 180, the outlet conduit 48 is locked in its rearwardly pivoted, dotted line position in which its outer end is disposed over the lid opening 90 of the cooking fluid receiving container 70. The detent pin 176 thus function to selectively lock the outlet conduit 48 in either its forwardly or rearwardly pivoted position.

The foregoing detailed description is to be clearly understood as being given by way of illustration and example only, the spirit and scope of the present invention being limited solely by the appended claims.

What is claimed is:

1. A modular system for constructing a filtered, multiple frypot deep fat frying cooking station comprising:
   a first module including:
      a first floor supportable housing having a plurality of frypots operatively mounted, in a closely adjacent side-by-side relationship, in an upper portion thereof and adapted to hold a predetermined quantity of cooking liquid, each of said frypots having a maximum side-to-side width, said first floor supportable housing having a horizontal width, extending between opposite side walls thereof, which is not substantially greater than the sum of said maximum side-to-side widths of said frypots,
      first supply header means, interconnected between said plurality of frypots, for receiving cooking liquid from a source thereof and flowing the received cooking liquid into a selected one of said plurality of frypots,
      first drain header means, interconnected between said plurality of frypots, for receiving cooking liquid drained from a selected one of said plurality of frypots, and
      filter and pumping means for receiving cooking liquid drained from said first drain header means, and pumping the filtered cooking liquid to and through said first supply header means, said filter and pumping means being removably positionable within said first floor supportable housing directly beneath said plurality of closely adjacent frypots, and being removably interconnectable between said first supply header means and said first drain header means; and
   a second module including:
      a second floor supportable housing having at least one frypot operatively mounted in an upper portion thereof and adapted to hold a predetermined quantity of cooking liquid,
      second supply header means, operative connected to said at least one frypot and connectable to said first supply header means to define an extension thereof, for receiving cooking liquid from said first supply header means and flowing the received cooking liquid into a selected one of said at least one frypot, and
      second drain header means, operatively connected to said at least one frypot and connectable to said first drain header means, for receiving cooking fluid drained from a select one of said at least one frypot and transferring the drained cooking liquid into said first drain header means,
      whereby said cooking station may be conveniently formed by positioning said first and second housing in an adjacent relationship, with said second floor supportable housing being positioned on either side of said first floor supportable housing, operatively interconnecting said first and second supply header means, and operatively interconnecting said first and second drain header means so that said filter and pumping means may be utilized in conjunction with any selected one of the multiple frypots in the resulting cooking station.

2. The modular system of claim 1 wherein:
   each of the frypots in said first and second modules is sized to hold approximately the melted product of a fifty pound block of cooking lard or an equivalent amount of cooking oil, and
   said filter and pumping means include a receiving container sized to receive and hold the entire cooking liquid quantity disposed in any one of the frypots in said first and second modules.

3. A modular system usable to form a filtered, multiple frypot deep fat frying station having from two to seven operatively interconnected frypots, said modular system comprising:
   a first filtered module having a first floor supportable housing with two frypots operative mounted in an upper port thereof in a closely adjacent side-by-side relationship, said two frypots each having a maximum side-to-side width and being interconnected by first supply header means and first drain header means respectively operative to flow cooking liquid from a source thereof into a selected one of the two frypots of said first filtered module and to receive cooking liquid drained from a selected one of the two frypots of said first filtered module, and first filter and pumping means, removably disposable within said first housing directly beneath said two closely adjacent frypots therein and removably interconnectable between said first drain header means, and pumping the filtered cooking liquid to and through said first supply header means, said first floor supportable housing having a pair of opposite side walls spaced apart a horizontal distance not substantially greater than the sum of said maximum side-to-side widths of said two frypots;

a second filtered module having a second floor supportable housing with three frypots operatively mounted in an upper portion thereof in a closely adjacent side-by-side relationship, said three frypots each having a maximum side-to-side width and being interconnected by second supply header means and second drain header means respectively operative to flow cooking liquid from a source thereof into a selected one of the three frypots of said second filtered module and to receive cooking liquid drained from a selected filter and pumping means, removable disposable within said first housing beneath said three frypots therein and removably interconnectable between said second supply header means and said second drain header means, for receiving and filtering cooking liquid drained from said second drain header means, and pumping the filtered cooking liquid to and through said second supply header means, said second floor supportable housing having a pair of opposite side walls spaced apart a horizontal distance not substantially greater than the sum of said maximum side-to-side widths of said three frypots;

at least one first non-filtered module having a third floor supportable housing with two frypots operatively mounted in an upper portion thereof and interconnected by third supply header means and third drain header means respectively operative to flow cooking liquid from a source thereof into a selected one of the two frypots of said first nonfiltered module and to receive cooking liquid drained from a selected one of the two frypots of said first nonfiltered module, said third supply header means being connectable to either of said first and second supply header means to define an extension thereof, said third drain header means being connectable to either of said first and second drain header means to define an extension thereof; and a second nonfiltered module having a fourth floor supportable housing with three frypots operatively mounted in an upper portion thereof and interconnected by fourth supply header means and fourth drain header means respectively operative to flow cooking liquid from a source thereof into a selected one of the three frypots of said second nonfiltered module and to receive cooking liquid drained from a selected one of the three frypots of said second nonfiltered module, said fourth supply header means being connectable to either of said first and second supply header means to define an extension thereof, said fourth drain header means being connectable to either of said first and second drain header means to define an extension thereof, whereby:

said first filtered module defines by itself a filtered, two frypot deep fat frying station, said second filtered module defines by itself a filtered, three frypot deep fat frying station, a filtered, four frypot deep fat frying station may be formed by adjacently positioning the housings of said first filtered module and one of said at least one first nonfiltered module, interconnecting said first and third supply header means, and interconnecting said first and third drain header means, a filtered, five frypot deep fat frying station may be formed by adjacently positioning the housing of said second filtered module and one of said at least one first nonfiltered module, interconnecting said second supply header means and said third supply header means, and interconnecting said second drain header means and said third drain header means, a filtered, six frypot deep fat frying station may be formed by adjacently positioning the housings of said second filtered module and said second nonfiltered module, interconnecting said second supply header means and said fourth supply header means, and interconnecting said second drain header means and said fourth drain header means, and a filtered, seven frypot deep fat frying station may be formed by positioning the housing of said second filtered module between the housings of a pair of said at least one first nonfiltered module, interconnecting said second supply header means with the third supply header means of said pair of said first nonfiltered modules, and interconnecting said second drain header means with the third drain header means of said pair of said first nonfiltered modules.

4. The modular system of claim 3 wherein:

each of the frypots in said modules is sized to hold approximately the melted product of a fifty pound block of cooking lard or an equivalent amount of cooking oil, and each of said first and second filter and pumping means includes a receiving container sized to receive and hold the entire cooking liquid quantity disposed in any one of the frypots in said modules.

5. Deep fat frying apparatus comprising:

a housing having an upper interior portion and a lower interior portion;

a frypot operatively supported in said upper interior housing portion and adapted to hold a predetermined quantity of cooking liquid;

supply piping means for flowing cooking liquid from a source thereof into said frypot;

drain piping means for receiving cooking liquid drained from said frypot, said drain piping means having an outlet operable to discharge the received cooking liquid;

a cooking liquid receiving container positioned within said lower interior housing portion beneath said drain piping means outlet to receive cooking liquid discharged therefrom;

filter means disposed within said container for filtering cooking liquid received therein;

a pump supported on said container and having an inlet and an outlet;

an inlet pipe interconnected between said container and said pump outlet for flowing filtered cooking liquid from said container into said pump inlet during operation of said pump;

outlet piping means interconnected between said pump outlet and said supply piping means and having a bypass portion for discharging the full pump outflow of cooking liquid directly into said container from said pump outlet during pump operation; and valve means disposed in said bypass portion, said valve means being closable to permit cooking liquid drained from said frypot through said drain piping means into said container to be filtered by said filter means and then drawn through said inlet pipe, flowed across said pump and then forced sequentially through said outlet piping means and said supply piping means into said frypot during pump operation, said valve means being openable to cause continued recirculation of cooking liquid from said pump outlet, through said outlet piping means and said bypass portion thereof into said container, across said filter means, and back into said pump through said inlet pipe during pump operation to thereby provide said apparatus with a selectively operable cooking liquid polishing cycle.

6. The apparatus of claim 5 wherein:

said outlet piping means include a tee fitting having an inlet, a first outlet and a second outlet, a first outlet pipe section interconnected between said pump outlet and said inlet of said tee fitting, a second outlet pipe section interconnected between said supply piping means and said first outlet of said tee fitting, and a third outlet pipe section connected to said second outlet of said tee fitting and defining said bypass portion of said outlet piping means.

7. The apparatus of claim 6 wherein:

said valve means comprise a two position manual shutoff valve operatively connected in said third outlet pipe section.

8. Deep fat frying apparatus comprising:

a housing having an upper interior portion and a lower interior portion;

frypot means, operatively mounted in said upper interior housing portion, for receiving a cooking liquid in which food items may be fried, said frypot means having drain means associated therewith through which cooking liquid therein may be drained; and drain header means disposed in said housing for receiving and discharging cooking fluid drained from said frypot means, said drain header means including:

a generally horizontally disposed drain header pipe structure positioned in said housing and connected to said drain means to receive cooking liquid discharged therefrom, said drain header pipe structure having an outlet section pivotable relative to the balance of said drain header pipe structure and having an outlet tube member transversely secured thereto for pivotal movement therewith between first and second positions, and means for releasably locking said outlet section in a selected one of said first and second positions thereof.

9. The apparatus of claim 8 wherein:

said housing has front and rear walls and a pair of opposite side walls, said drain header pipe structure extends longitudinally between said opposite side walls, said outlet tube in said first position extends forwardly and downwardly from said outlet section, and said outlet tube in said second position extends rearwardly and downwardly from said outlet section.

10. The apparatus of claim 8 wherein:

said outlet section is positioned between longitudinally separated first and second sections of said drain header pipe structure and has a circular hollow cylindrical configuration, said first and second sections have circular cylindrical mounting collars affixed thereto that telescopingly engage and pivotally support opposite end portions of said outlet section, and said means for releasably locking include alignable radial openings formed in one of said mounting collars and its associated outlet section end portion, and detent means insertable into the aligned openings to releasably lock said outlet tube in a selected one of its first and second positions.

11. The apparatus of claim 10 wherein:

said opposite end portions of said outlet section are received within said collar members, and said apparatus further comprises seal means for forming liquid seals between said collars and said opposite end portions of said outlet section.

* * * * *

UNITED STATES PATENT AND TRADEMARK OFFICE
CERTIFICATE OF CORRECTION

PATENT NO. : 4,899,649

DATED : February 13, 1990

INVENTOR(S) : James T. Grob; John M. Kinch

It is certified that error appears in the above-identified patent and that said Letters Patent is hereby corrected as shown below:

Col. 12, line 23, "select" should be --selected--

Col. 12, line 52, "operative" should be --operatively--

Col. 12, line 53, "port" should be --portion--

Col. 12, line 65, after "first" insert --supply header means and said first--

Col. 13, line 15, after "selected" insert --one of the three frypots of said second filtered module, and second--

Col. 13, line 16, "removable" should be --removably--

Col. 14, line 2, "housing" should be --housings--

Col. 14, line 55, "outlet" should be --inlet--

Signed and Sealed this

Tenth Day of September, 1991

*Attest:*

HARRY F. MANBECK, JR.

*Attesting Officer*      *Commissioner of Patents and Trademarks*